US011867957B2

(12) United States Patent
Pastier et al.

(10) Patent No.: US 11,867,957 B2
(45) Date of Patent: Jan. 9, 2024

(54) HIGH-PRECISION METHOD FOR COUPLING AN OPTICAL FIBER WITH A PHOTONIC DEVICE AND IMPLEMENTATION MICROSTRUCTURE

(71) Applicant: QUANDELA, Palaiseau (FR)

(72) Inventors: Florian Pastier, Paris (FR); Niccolo Somaschi, Paris (FR); Valérian Giesz, Massy (FR)

(73) Assignee: QUANDELA, Palaiseau (FR)

( * ) Notice: Subject to any disclaimer, the term of this patent is extended or adjusted under 35 U.S.C. 154(b) by 0 days.

(21) Appl. No.: 17/725,841

(22) Filed: Apr. 21, 2022

(65) Prior Publication Data
US 2022/0350094 A1 Nov. 3, 2022

(30) Foreign Application Priority Data

Apr. 28, 2021 (FR) ...................................... 2104457

(51) Int. Cl.
*G02B 6/42* (2006.01)
(52) U.S. Cl.
CPC .................. *G02B 6/4227* (2013.01)
(58) Field of Classification Search
CPC ................ G02B 6/4202; G02B 6/4203; G02B 6/422–4227
See application file for complete search history.

(56) References Cited

U.S. PATENT DOCUMENTS

| 5,418,870 | A | 5/1995 | Keck et al. |
| 10,126,511 | B2 * | 11/2018 | Böldicke ................ G02B 6/423 |
| 2004/0022487 | A1 | 2/2004 | Nagasaka et al. |
| 2004/0114873 | A1 | 6/2004 | Alexeev et al. |

FOREIGN PATENT DOCUMENTS

| EP | 0826997 A2 | 3/1998 |
| JP | 2014116417 A | 6/2014 |
| WO | 2013/112171 A1 | 8/2013 |

OTHER PUBLICATIONS

Florian Haupt, Sumant S. R. Oemrawsingh, Susanna M. Thon, Hyochul Kim, Dustin Kleckner, Dapeng Ding, Donald J. Suntrup, Pierre M. Petroff, Dirk Bouwmeester; Fiber-connectorized micropillar cavities; Appl. Phys. Lett. Sep. 27, 2010; 97 (13): 131113. https://doi.org/10.1063/1.3493187 (Year: 2010).*
Schlehahn, A., Fischbach, S., Schmidt, R. et al; A stand-alone fiber-coupled single-photon source; Sci Rep 8, 1340 (2018). https://doi.org/10.1038/s41598-017-19049-4 (Year: 2018).*
International Search Report and Written Opinion in PCT Application No. PCT/FR2022/050805, dated Aug. 9, 2022.

* cited by examiner

*Primary Examiner* — Omar R Rojas
(74) *Attorney, Agent, or Firm* — Leason Ellis LLP

(57) ABSTRACT

The method comprises the steps of A) equipping the end of the fiber with an added microstructure (MS) arranged so as to provide support on a surrounding structure forming a support (SE) distinct from the photonic device (PIL) and to prevent any contact with a sensitive surface (FA) of the photonic device, B) optimally aligning, in position and in angle, the fiber end with the sensitive surface, and C) exerting on the microstructure and/or the optical fiber a bearing pressure (P) against the surrounding support structure, maintaining an optimal spacing distance (D) and alignment between the fiber end and the sensitive surface.

12 Claims, 9 Drawing Sheets

[Fig. 1]
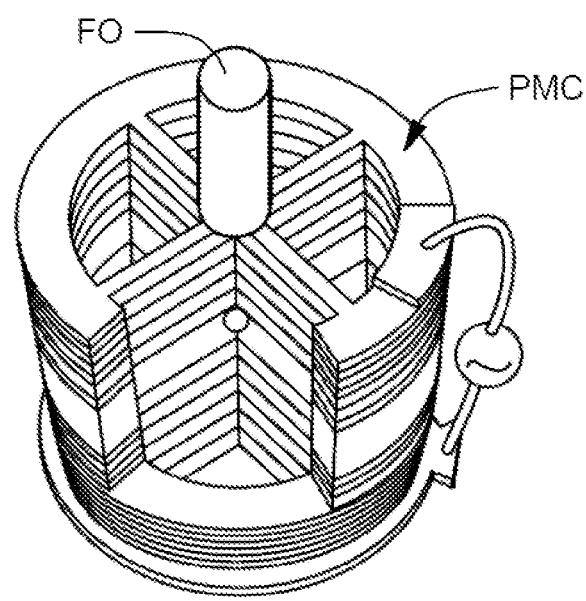

[Fig. 2]
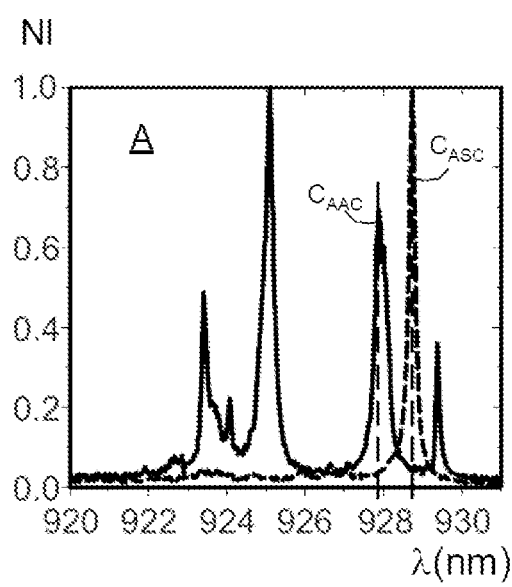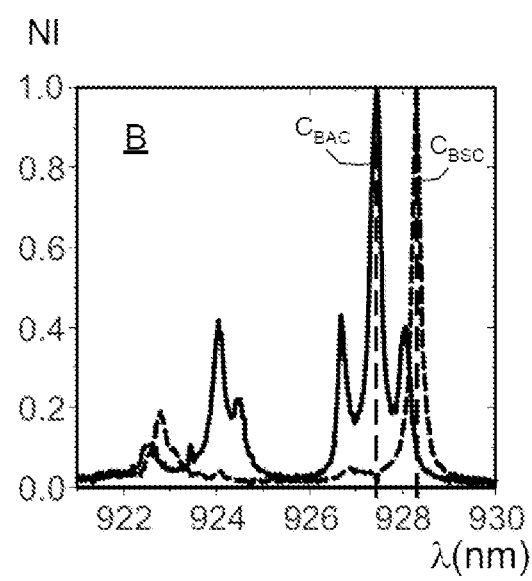

[Fig. 3]
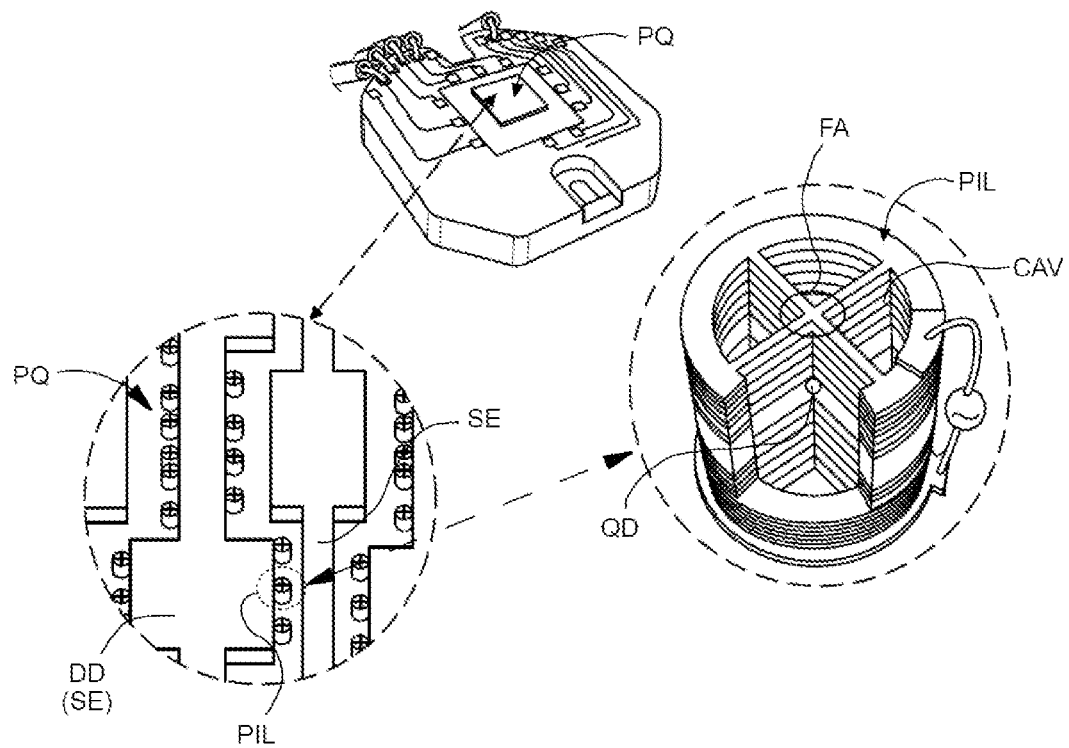

[Fig. 4]
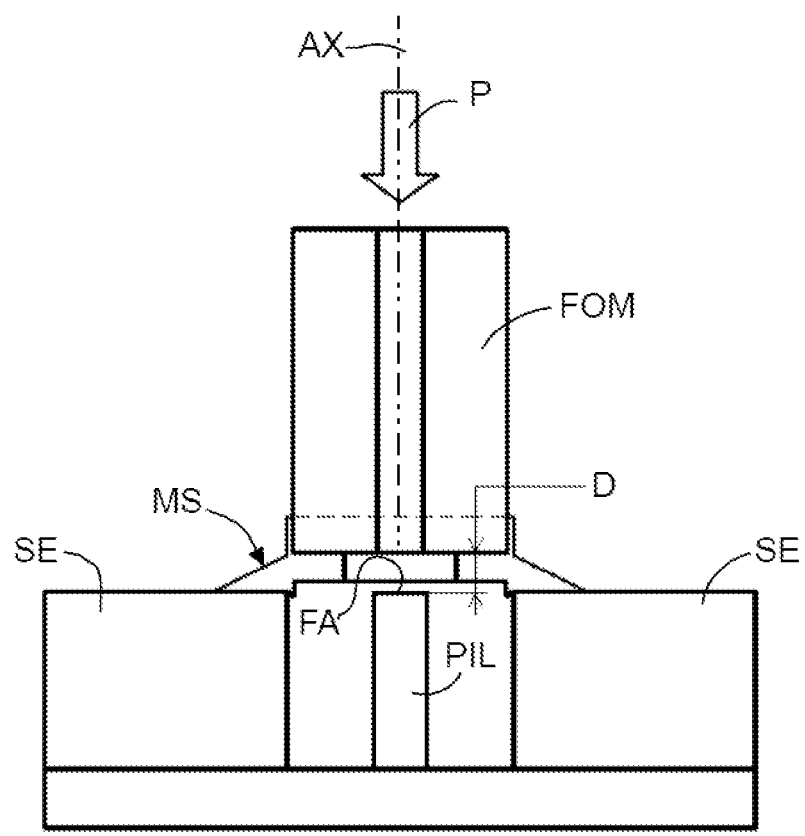

[Fig. 5]
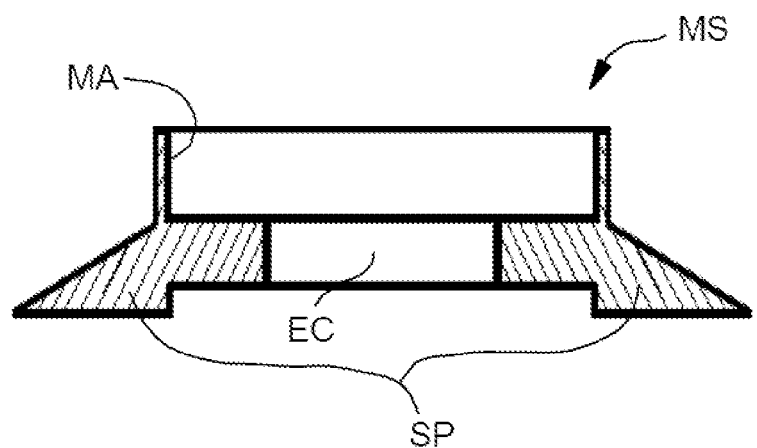

[Fig. 6]
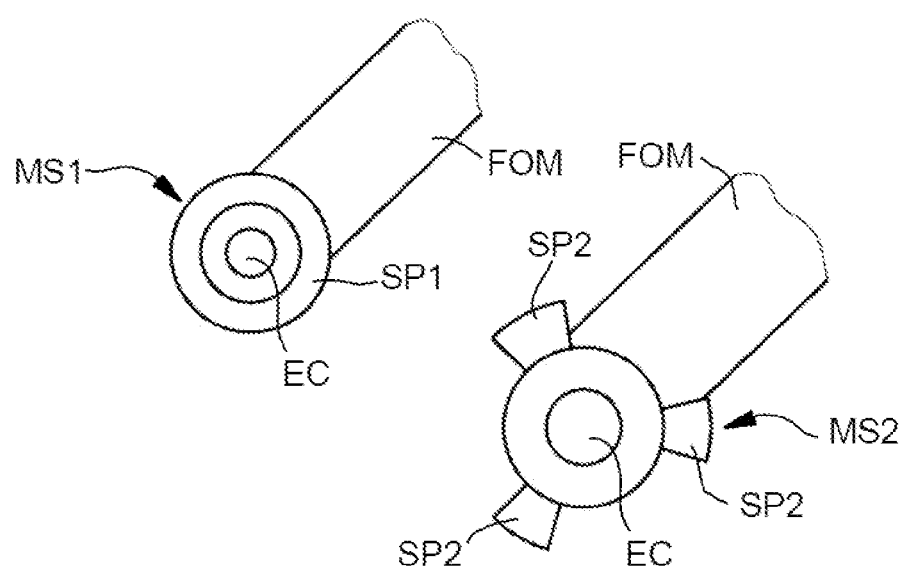

[Fig. 7]
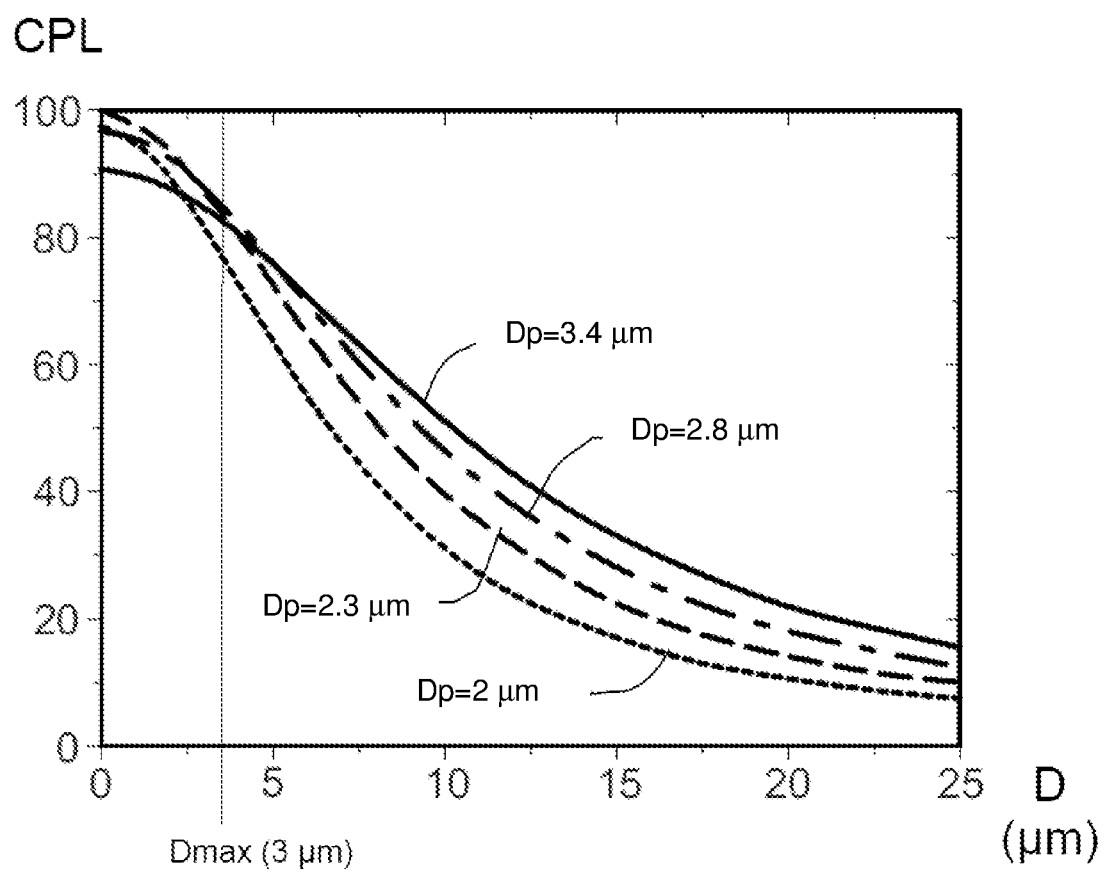

[Fig. 8]
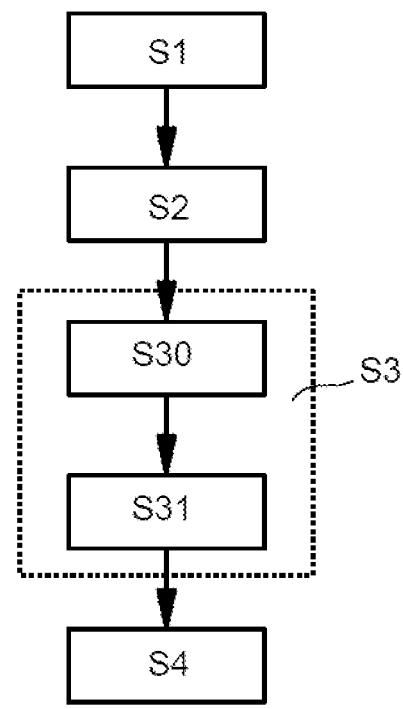

[Fig. 9]
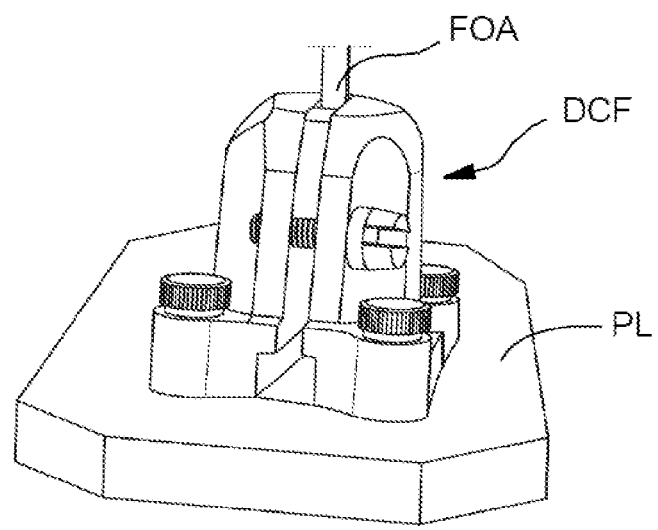

HIGH-PRECISION METHOD FOR COUPLING AN OPTICAL FIBER WITH A PHOTONIC DEVICE AND IMPLEMENTATION MICROSTRUCTURE

1. FIELD

The invention generally relates to the field of optics, including quantum optics. More particularly, the invention relates to a method for high-precision coupling of an optical fiber with an active or passive photonic device. The invention also relates to a microstructure for the implementation of the aforementioned method.

2. BACKGROUND

In general, optical fiber is ubiquitous in optical systems for transporting photons from one point to another. In an optical system comprising, for example, a photon transmitter and receiver devices connected by an optical fiber, the precise coupling between the ends of the optical fiber and the transmitter and receiver devices is essential for minimizing losses and achieving a satisfactory operation of the system.

Submicron alignment precision between the end of the optical fiber and the active face of the device may be required for certain systems, in particular in a quantum information system. Haupt et al. in his article entitled "Fiber-connectorized micropillar cavities," September 2010, Applied Physics Letters 97(13), proposes an active alignment procedure, carried out at room temperature, making it possible to achieve a submicron alignment precision which is maintained at a cryogenic temperature. This active alignment procedure uses a laser beam emitted by the end of the optical fiber and illuminating the active face of the device. Thus, in the case where the device is an emitting source, such as a semiconductor micropillar integrating a quantum dot, the optimal alignment is obtained when a signal detected, typically by means of a camera, has a minimum amplitude. In the case where the device is a detector, the optimal alignment is obtained when the signal delivered by the detector has a maximum amplitude.

Concerning the mechanical fixation in the position of optimal alignment between the optical fiber and the device, Haupt et al. and other authors advocate the use of adhesive. Thus, Snijders et al. in his article titled "A fiber coupled cavity QED source of identical single photons," Physical Review Applied 9, 031002, 28 Mar. 2018, describes the use of a Norland® brand UV-curable optical adhesive for the bonding of two single-mode optical fibers on front and rear active faces of a single photon source in the form of a Fabry-Perot microcavity. The authors, Schlehahn et al., Bremer et al. and Ortiz et al. respectively, in their articles "A stand-alone fiber-coupled single-photon source," Scientific Reports, 8:1340, 22 Jan. 2018, "Quantum dot single-photon emission coupled into single-mode fibers with 3D printed micro-objectives," APL Photonics 5, 106101, 1 Oct. 2020, and "Fiber-integrated microcavities for efficient generation of coherent acoustic phonons," Applied Physics Letters, 117, 18, August 2020, also describe mechanical bonding with adhesive.

Document US2017176697A1 discloses a method for manufacturing a vertical optical coupling structure between optical or optoelectronic components. The optical coupling structure is made so as to be located opposite and in contact with optical or optoelectronic components supported by a substrate. To produce the optical coupling structure, a main layer is deposited on the substrate and is shaped by physico-chemical etching and/or lithography techniques. Tapered coupling portions are made in the main layer, with a material having a refractive index greater than the refractive index of air. These coupling portions are each made with first and second transverse end surfaces, provided to come into contact respectively with an emitting or receiving face of an optical or optoelectronic component on the substrate and an emitting or receiving face of another optics or optoelectronics component. In this method, the coupling structure is superimposed on the substrate and is in contact with the optical or optoelectronic components, which makes it unusable for many applications that do not allow the surface production of such a structure.

Document WO2016195483A1 discloses a method for aligning a light source with an optical fiber. In this method, the light source is first embedded in the center of a circular cylindrical substrate. A substrate holder is then attached to the end of the optical fiber and the holder and fiber are inserted into an alignment sleeve. This method does not allow the implementation of the active alignment procedure of Haupt et al. mentioned above, which ensures that submicron alignment precision is achieved.

3. SUMMARY

The work carried out by the inventive entity on the coupling of an optical fiber with a source of single photons, such as the PMC semiconductor micropillar shown in FIG. 1, has demonstrated that an alignment precision in a plane of the 500 nm order is necessary between the end of the optical fiber and the active face of the microcavity. Alignment performed at ambient temperature of 300 K should be maintained with the same precision at the cryogenic operating temperature of the single photon source, typically around 5 K. The active alignment procedure of Haupt et al. allows alignment with the desired precision.

However, measurements carried out by the inventive entity have highlighted the limits of bonding as a mechanical fixing technique, in particular for the set shown in FIG. 1 of the PMC single-photon source and a single-mode optical fiber (FO) bonded by its end on the emission active face thereof. Indeed, after the hardening of the adhesive, mechanical stresses may appear in the active material of the PMC source and cause changes in performance. With the cyclic variations in temperature, risks of irreparable damage to the PMC source, or even total destruction of the latter, are also to be feared.

The above statements are illustrated by FIG. 2 which shows readings of normalized intensity (NI) according to the wavelength for the PMC source, before bonding and after bonding, in two distinct sets A and B, like that of FIG. 1, having the same characteristics. The CASC and CBSC curves are the readings obtained without adhesive, respectively for sets A and B. The CAAC and CBAC curves are the readings obtained after bonding, respectively for sets A and B. These measurements show shifts in resonance and level of energy introduced into the PMC source by the bonding of the optical fiber (FO), shifts which differ substantially between the sets A and B which have nevertheless the same characteristics. The non-predictability of these shifts invalidates the bonding solution as a solution guaranteeing performance reproducibility.

The present invention aims to provide a coupling solution between an optical fiber and an active or passive photonic device, allowing high alignment precision and not having the aforementioned drawbacks of the prior art. The aforementioned active or passive photonic device covers different types of devices known to a person skilled in the art, including optical coupling systems in the form of a grating, a waveguide or others.

4. BRIEF DESCRIPTION OF THE DRAWINGS

FIG. 1 is a simplified perspective view of a set according to the prior art formed of a source of single photons and an optical fiber having one end bonded to the source.

FIG. 2 shows measurement readings obtained with a prior art set such as that of FIG. 1.

FIG. 3 is a view showing a quantum chip as an example of an environment in which the present invention is applicable.

FIG. 4 is a simplified sectional view of a set according to the invention of a source of single photons, in the form of a semiconductor micropillar, a microstructure and an optical fiber having one end coupled with the source.

FIG. 5 is a simplified sectional view of a microstructure according to the invention included in a set of the invention such as that of FIG. 4 and arranged at the end of the optical fiber.

FIG. 6 is a simplified perspective view showing two different embodiments of the microstructure of the invention.

FIG. 7 shows readings for semiconductor micropillars of different diameters of the coupling obtained according to a spacing distance between the end of the optical fiber and an active face of the micropillar.

FIG. 8 is a diagram showing steps of the method according to the invention.

FIG. 9 is a perspective view showing an example of a mechanical device used for fixing the end of the optical fiber on a plate incorporating a quantum chip, facing an active or passive photonic device of the quantum chip with which the end of the optical fiber is coupled by the implementation of the method of the invention.

5. DETAILED DESCRIPTION

According to a first aspect, the invention relates to a method for coupling an optical fiber with a photonic device, the optical fiber having one fiber end opposite a sensitive surface of the photonic device. In accordance with the invention, the method comprises the successive steps of A) equipping the end of the fiber with an added microstructure arranged so as to provide support on a surrounding structure forming a support separate from the photonic device and to prevent any contact with the sensitive surface of the photonic device, B) optimally aligning, in position and angle, the fiber end with the sensitive surface by performing an active alignment procedure, and C) exerting a bearing pressure on the microstructure and/or the optical fiber against the surrounding support structure so as to maintain an optimal spacing distance and alignment between the fiber end and the sensitive surface.

According to another particular characteristic, step B) also includes the determination of the optimal spacing distance.

According to yet another particular characteristic, the optimal spacing distance is less than 3 μm.

According to another aspect, the invention also relates to a microstructure for coupling an optical fiber with a photonic device by implementing the method briefly described above, the microstructure being in the form of a single-piece part comprising a portion forming an optical fiber assembly sleeve and a portion forming a support base.

According to a particular characteristic, the microstructure is made of a polymer material.

According to another particular characteristic, the microstructure is made of a flexible material or a hard material.

According to yet another particular characteristic, the part forming the support base is in the general shape of a ring.

According to yet another particular characteristic, the part forming the support base is in the general shape of a tripod.

The invention also relates to a set comprising an optical fiber, a photonic device and a microstructure as briefly described above which is arranged on one end of the optical fiber facing the photonic device.

Other advantages and characteristics of the present invention will appear more clearly on reading the description below of several particular embodiments with reference to the appended drawings, in which:

The method and the microstructure of the invention are now described below with reference to FIGS. 3 to 9, in the context of their application to the coupling of a single-mode optical fiber, designated FOM, with a source of single photons or entangled photons, designated PIL, of the semiconductor micropillar device type integrating at least one quantum box. The PIL source is also referred to as "semiconductor micropillar" in the remainder of the specification.

Referring to FIG. 3, the semiconductor pillar PIL essentially comprises a QD quantum box, in the form of a semiconductor nanostructure, and resonant microcavities CAV. The semiconductor micropillar PIL is a quantum structure capable of producing single photons, entangled or not, on demand, for quantum applications. The photons are emitted by an active face FA opposite which the optical fiber FOM must be aligned and held in position with high precision over a temperature range from room temperature to cryogenic temperature. In this example of application of the invention, as illustrated in FIG. 3, the semiconductor micropillar PIL is integrated into a quantum chip PQ comprising here a plurality of similar micropillars PIL. The quantum chip PQ typically includes other structures and components located in the near environment of the micropillars PIL, such as laser diodes DD for electronic control of QD quantum dots and passive devices such as waveguides, splitters or others. In general, the structures and components located in the near environment of the micropillars PIL are referred to as "structures SE" in the remainder of the text.

In accordance with the invention, as shown in FIGS. 4 and 6, the optical fiber FOM is provided at its end with a microstructure MS which is an added piece. The microstructure MS serves as a mounting support for coupling the optical fiber FOM with the semiconductor micropillar PIL. The microstructure MS is arranged in such a way as to allow optimal positioning of the end of the optical fiber FOM opposite the active face FA of the semiconductor micropillar PIL, without any contact between the end of the optical fiber FOM and the microstructure MS with this active face FA which is a sensitive surface of the semiconductor micropillar PIL. More generally, in accordance with the invention, the microstructure MS is arranged so as to prevent any contact with a sensitive surface of the photonic device, which is the semiconductor micropillar PIL in the exemplary embodiment described here.

As best seen in FIG. 5, the microstructure MS is a single-piece part which essentially comprises a part MA forming an assembly sleeve with the optical fiber FOM and a part SP forming a support base.

The part forming the assembly sleeve MA typically has a substantially circular cylindrical shape, compatible with the circular section of the fiber. A central bore is made in the part forming the assembly sleeve MA to receive the end of the optical fiber FOM which is tightly mounted in it. A bottom wall of the part of the assembly sleeve MA has a central circular opening EC. The central circular opening EC typically has a diameter greater than that of the core of the optical fiber FOM, to obtain a total release of material at the end of the optical fiber FOM, between the core thereof and the active face FA of the semiconductor micropillar PIL.

In accordance with the invention, the part forming the support base SP is designed to rest on one or more structures SE in the immediate vicinity of the semiconductor micropillar PIL, but avoiding any contact with the latter and, in particular, with its active face FA or any other part sensitive to contact or pressure. The part forming the support base SP may have different shapes and dimensions depending on the application and, in particular, depending on the configuration of the surrounding structures SE.

Two non-limiting examples of embodiment of the microstructure, MS1 and MS2, are shown in FIG. 6 by way of illustration. In the microstructure MS1, the part forming the support base SP1 is in the shape of a ring, or flange. In the microstructure MS2, the part forming the support base SP2 is configured as a tripod.

The microstructure MS may be manufactured in different types of flexible or rigid materials, depending on the application. Thus, for example, satisfactory results were obtained by providing a single-mode optical fiber 125 μm in diameter with a polymer microstructure MS, of the aforementioned ring type and having a height of 3 μm.

With reference to FIG. 7, tests carried out by the inventive entity for an optical wavelength of approximately 930 nm and with semiconductor micropillars of different diameters Dp=2 μm, Dp=2.3 μm, Dp=2.8 μm and Dp=3.4 μm, have shown that optimal coupling CPL between the optical fiber FOM and the semiconductor micropillar PIL is obtained when the spacing distance D (see FIG. 4) between the end of the optical fiber FOM and the active face FA is less than a distance Dmax of approximately 3 μm. Indeed, in order to maximize the signal in the optical fiber FOM, the latter must be as close as possible to the active face FA, but without touching the latter in accordance with the invention. A precision on the gap distance D of the order of 1 to 2 μm is generally required, depending on the application.

In accordance with the invention, the application of a pressure P (see FIG. 4) on the optical fiber FOM, along the longitudinal axis AX thereof and towards the active face FA, is recommended to obtain and maintain the desired optimal coupling relationship.

Referring now to FIG. 8, the method according to the invention essentially comprises four major steps S1 to S4 shown in FIG. 8.

Step S1 relates to the fitted mounting of the microstructure MS at the end of the optical fiber FOM. The mechanical fixing will typically be obtained by mounting with elastic clamping or any other means known to a person skilled in the art.

Step S2 relates to a first placement of the optical fiber FOM above the semiconductor micropillar PIL, by placing the microstructure MS on the structure(s) SE close to the semiconductor micropillar PIL, without any contact with the active face FA or any sensitive part of the micropillar.

Step S3 relates to the search for the optimal alignment, in position and angle, between the end of the optical fiber FOM and the active face FA, by means of an active alignment procedure such as that of Haupt et al. cited above. Firstly, in a sub-step S30, the spacing distance D is adjusted to approximately Dmax=3 μm and the optimal position of the microstructure MS is sought by micro-displacements of the latter in a substantially coplanar plane on the surface of the active face FA. Secondly, in a sub-step S31, the optimal spacing distance D is sought by applying the pressure P on the optical fiber FOM, thereby pressing the microstructure MS against the support structure(s) SE and, correlatively, bringing the end of the optical fiber FOM closer to the active face FA.

Step S4 relates to the final mechanical locking of the position of the optical fiber FOM relative to the active face FA, in order to maintain the optimal coupling obtained in step S3.

Typically, steps S2 to S4 are performed while the optical fiber FOM, provided with its microstructure MS, is enclosed in a mechanical device which allows precise adjustment of the displacements of the latter, application of pressure and final locking of the optimal coupling position. For example, such a mechanical device could be integrated into a fiber connection device such as the device DCF shown by way of illustration in FIG. 9. As visible in FIG. 9, the device DCF encloses the end of an optical fiber FOA and is fixed on a plate PL which supports a quantum chip (not shown) having an active, or passive, device, to which the optical fiber FOA is coupled.

The invention provides a high-quality coupling, not sensitive to temperature. The application of the pressure P provides greater tolerance to displacements, with an improvement at least 100-fold.

The invention is applicable to the coupling of an optical fiber with a wide variety of active or passive photonic devices, of the emitter, detector, waveguide and other type.

Understandably, the invention is not limited to the embodiments which were described here by way of illustration. A person skilled in the art, depending on the applications of the invention, may make various modifications and variants falling within the scope of protection of the invention.

The invention claimed is:

1. A method for coupling an optical fiber (FOM) with a photonic device (PIL), said optical fiber (FOM) having one fiber end facing a sensitive surface (FA) of said photonic device (PIL), characterized in that said coupling being configured to be insensitive to temperature, and in that it comprises the successive steps of
   A) providing said fiber end with an added microstructure (MS) arranged so as to provide support on a surrounding structure forming a support (SE) distinct from said photonic device (PIL) and to prevent any contact with said sensitive surface (FA) of said photonic device (PIL),
   B) optimally aligning, at room temperature, in position and in angle, said fiber end with said sensitive surface (FA) by performing an active alignment, and
   C) exerting on said microstructure (MS) and/or said optical fiber (FOM) a bearing pressure (P) against said surrounding structure forming a support (SE) so as to maintain a spacing distance (D) and an optimal alignment between said fiber end and said sensitive surface (FA) over a temperature range from an ambient temperature of 300K to a cryogenic operating temperature about 5K.

2. The method according to claim 1, characterized in that said step B) comprises determining said optimal spacing distance (D).

3. The method according to claim 1, characterized in that said optimal spacing distance (D) is less than 3 μm (Dmax).

4. A microstructure (MS) for coupling an optical fiber (FOM) with a photonic device (PIL) by implementing the method according to claim 1, characterized in that it is in the form of a single-piece part comprising a part forming an optical fiber assembly sleeve (MA) and a part forming a support base (SP).

5. The microstructure according to claim 4, characterized in that it is made of a polymer material.

6. The microstructure according to claim 4, characterized in that it is made of a flexible material or a hard material.

7. The microstructure according to claim 4, characterized in that said part forming a support base (SP1) is in the general shape of a ring.

8. The microstructure according to claim 4, characterized in that said part forming a support base (SP2) is in the general shape of a tripod.

9. A set comprising an optical fiber (FOM), a photonic device (PIL) and a microstructure (MS) arranged on one end of said optical fiber (FOM) facing said photonic device (PIL), characterized in that said microstructure (MS) is a microstructure according to claim 4.

10. The method according to claim 1, comprising, after the step of exerting on said microstructure (MS) and/or said optical fiber (FOM) a bearing pressure (P), cooling down at least said microstructure (MS) and said optical fiber (FOM) from an ambient temperature of 300K to a cryogenic operating temperature about 5K.

11. A method for coupling an optical fiber (FOM) with a photonic device (PIL), said optical fiber (FOM) having one fiber end facing a sensitive surface (FA) of said photonic device (PIL), characterized in that said coupling being configured to be insensitive to temperature, and in that it comprises the successive steps of A) providing said fiber end with an added microstructure (MS) arranged so as to provide support on a surrounding structure forming a support (SE) distinct from said photonic device (PIL) and to prevent any contact with said sensitive surface (FA) of said photonic device (PIL), B) optimally aligning, at room temperature, in position and in angle, said fiber end with said sensitive surface (FA) by performing an active alignment, and C) exerting on said microstructure (MS) and/or said optical fiber (FOM) a bearing pressure (P) against said surrounding structure forming a support (SE) so as to maintain a spacing distance (D) and an optimal alignment between said fiber end and said sensitive surface (FA) over a temperature range from an ambient temperature of 300K to a cryogenic operating temperature about 50K.

12. The method according to claim 11, comprising, after the step of exerting on said microstructure (MS) and/or said optical fiber (FOM) a bearing pressure (P), cooling down at least said microstructure (MS) and said optical fiber (FOM) from an ambient temperature of 300K to a cryogenic operating temperature about 50K.

* * * * *